United States Patent [19]

Hirose et al.

[11] Patent Number: 4,735,829

[45] Date of Patent: Apr. 5, 1988

[54] PROCESS FOR FORMING A PRESSURE SENSITIVE ADHESIVE ON A SUBSTRATE

[75] Inventors: Toshifumi Hirose; Katsuhiko Isayama, both of Kobe, Japan

[73] Assignee: Kanegafuchi Kagaku Kogyo Kabushiki Kaisha, Osaka, Japan

[21] Appl. No.: 24,211

[22] Filed: Mar. 10, 1987

Related U.S. Application Data

[62] Division of Ser. No. 770,475, Aug. 29, 1985, Pat. No. 4,665,127.

[30] Foreign Application Priority Data

Aug. 31, 1984 [JP] Japan ................... 59-183097

[51] Int. Cl.$^4$ .............................................. B05D 3/02
[52] U.S. Cl. ................................... 427/387; 428/447;
525/100; 525/101; 525/102; 525/104; 525/105;
525/106; 525/403; 528/16; 528/17; 528/33;
528/34
[58] Field of Search ............... 525/100, 101, 102, 104,
525/105, 106, 403; 528/16, 17, 33, 34; 427/387;
428/447

[56] References Cited

U.S. PATENT DOCUMENTS

| | | | |
|---|---|---|---|
| 4,463,115 | 7/1984 | Hirose et al. | 524/188 |
| 4,618,646 | 10/1986 | Takago et al. | 525/100 |
| 4,618,653 | 10/1986 | Kawakubo et al. | 525/404 |
| 4,618,656 | 10/1986 | Kawakubo et al. | 525/404 |
| 4,665,127 | 5/1987 | Hirose et al. | 525/100 |

*Primary Examiner*—Melvyn I. Marquis
*Attorney, Agent, or Firm*—Armstrong, Nikaido, Marmelstein & Kobovcik

[57] ABSTRACT

A process for preparing a pressure sensitive adhesive comprising:

(A) an organic polymer having in its molecule at least one reactive silicon-containing group represented by the formula (I):

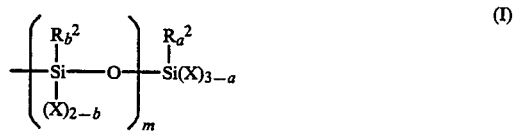

wherein $R^2$ is a monovalent hydrocarbon group having 1 to 20 carbon atoms or a triorganosiloxy group having the formula (II):

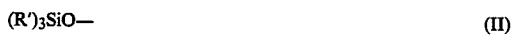

in which $R'$ is a monovalent hydrocarbon group having 1 to 20 carbon atoms and may be the same or different, X is hydroxyl group or a hydrolyzable group, and may be the same or different when 2 or more X groups are attached, a is 0 or an integer of 1 to 3, b is 0, 1 or 2, and m is 0 or an integer of 1 to 18, and (B) 0.1 to 20 parts by weight of, per 100 parts by weight of the organic polymer, at least one curing catalyst selected from the group consisting of an organic aluminium and an organic zirconium. The composition has excellent heat resistance and releasability from substrates, e.g. a release paper coated with a silicone release agent.

6 Claims, No Drawings

PROCESS FOR FORMING A PRESSURE SENSITIVE ADHESIVE ON A SUBSTRATE

This is a division of application Ser. No. 770,475, filed 8-29-85 now U.S. Pat. No. 4,665,127.

BACKGROUND OF THE INVENTION

The present invention relates to a pressure sensitive adhesive composition, and more particularly to the composition containing a polymer having a reactive silyl group, which has excellent releasability from a release paper.

A pressure sensitive adhesive is a kind of adhesive which is permanently tacky and can firmly adhere to a surface without the need of more than finger pressure. Examples of the use of pressure sensitive adhesive are in cellophane, masking and electrical tapes and in self-adhering label and sheet.

A pressure sensitive adhesive must have important properties that not only it can adhere to a surface of materials, but also it can easily peeled off from a desired surface of materials. For instance, in case that the pressure sensitive adhesive is applied to a self-adhering label or sheet, the pressure sensitive adhesive face is protected with a release paper. This release paper must be easily peeled off from the pressure sensitive adhesive face, that is, the release paper must not be teared or the pressure sensitive adhesive must not remain on the release paper. In case of a electrical tape, the back side of the pressure sensitive adhesive face must have the same properties that release papers have.

Examples of the release paper are, for instance, a paper treated with a silicone release agent or a fluorine compound, and the like. The releasability of the electrical tape is also improved by applying a silicone release agent or the like on the back side of the pressure sensitive agent.

Many pressure sensitive adhesives are excellent in the releasability from the above-mentioned release paper or back side of tape. As the pressure sensitive adhesive composition having excellent releasability, there is known a composition such as rubber pressure sensitive adhesive composition prepared by admixing a natural rubber or a synthetic rubber with a tackifier, or a polyacrylate pressure sensitive adhesive composition containing a polyacrylate prepared by copolymerizing acrylic acid esters. However, these pressure sensitive adhesives have the disadvantage that the heat resistance is poor. That is, the foundamental properties for pressure sensitive adhesives such as adhesive strength and holding power are remarkably lowered with increase in temperature. Because natural or synthetic rubber pressure sensitive adhesives are adhesives of non-crosslinking type, it is expected that they are poor in heat resistance. Even with respect to the polyacrylate pressure sensitive adhesive, in spite that the polyacrylate is cross-linked by a cross-linking agent such as an isocyanate, the heat resistance of the cross-linked polyacrylate itself is not always sufficient.

On the other hand, as a pressure sensitive adhesive having excellent heat resistance, a silicone pressure sensitive adhesive prepared by admixing a dimethyl polysiloxane rubber as a base material with a silicone resin has been known. However, the silicone pressure sensitive adhesive has the disadvantages that it has a high adhesive strength even to a nonpolar substance such as polytetrafluoroethylene and also it has an insufficient releasability to a silicone release paper, because both the silicone pressure sensitive adhesive and the silicone release paper include polysiloxane and the silicone release paper include polysiloxane and accordingly are compatible with each other.

Recently, it is proposed to prepare a pressure sensitive adhesive composition having excellent heat resistance by introducing a reactive silicon-containing group (hereinafter referred to as "reactive silicon group") into a organic polymer, thus heat stable siloxane linkages are formed by condensation reaction of the reactive silicon group. Such a pressure sensitive adhesive is disclosed, for instance, in U.S. Pat. No. 4,463,115 to the present inventors. However, this pressure sensitive adhesive of cross-linking type has the disadvantage that its releasability from a silicone release paper is poor like the above-mentioned silicone pressure sensitive adhesive in spite that this pressure sensitive adhesive has essentially a main chain of organic skeleton. That is, when this pressure sensitive adhesive is laminated to a release paper or film or when this pressure sensitive adhesive is coated onto a substrate the backside of which is coated with a silicone release agent and the coated substrate is wound, the peeling resistance between the pressure sensitive adhesive layer and the release paper or film rises with the lapse of time and the release paper cannot be peeled off due to breaking of the paper in the worst case.

An object of the invention is to provide a pressure sensitive adhesive composition having excellent heat resistance and releasability from substrates, e.g. a release paper coated with a silicone release agent.

This and other objects of the present invention will become apparent from the description hereinafter.

SUMMARY OF THE INVENTION

In accordance with the present invention, there is provided a pressure sensitive adhesive composition comprising:

(A) an organic polymer having at least one reactive silicon-containing group represented by the formula (I):

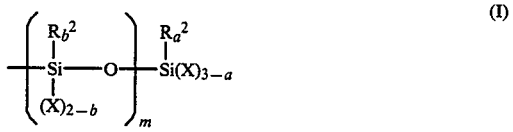

wherein $R^2$ is a monovalent hydrocarbon group having 1 to 20 carbon atoms or a triorganosiloxy group having the formula (II):

in which R' is a monovalent hydrocarbon group having 1 to 20 carbon atoms and may be the same or different, X is hydroxyl group or a hydrolyzable group, and may be the same or different when 2 or more X groups are attached, a is 0 or an integer of 1 to 3, b is 0, 1 or 2, and m is 0 or an integer of 1 to 18, and (B) 0.1 to 20 parts by weight of, based on 100 parts by weight of said organic polymer, at least one curing catalyst selected from the group consisting of an organic aluminium and an organic zirconium.

The pressure sensitive adhesive composition of the invention has excellent heat resistance and releasability from release paper such as silicone release paper.

DETAILED DESCRIPTION

In the present invention, the organic polymer having at least one reactive silicon group in its molecule used as a component (A) is a polymer having at least one reactive silicon group per one molecule at the polymer chain end or the side chain. The term "reactive silicon group" as used herein means a group capable of condencing in the presence of moisture or a cross-linking agent, and if necessary, with a catalyst, for instance, silicon-containing group having a hydrolyzable group which links to silicon atom, or a silanol group. The reactive silicon group is represented by the formula (I):

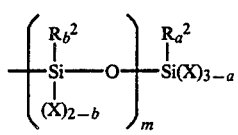

(I)

wherein $R^2$ is a monovalent hydrocarbon group having 1 to 20 carbon atoms or a triorganosiloxy group having the formula (II):

$(R')_3SiO-$   (II)

in which $R'$ is a monovalent hydrocarbon group having 1 to 20 carbon atoms and may be the same or different, X is hydroxyl group or a hydrolyzable group, and may be the same or different when 2 or more X groups are attached, a is 0 or an integer of 1 to 3, b is 0, 1 or 2, and m is 0 or an integer of 1 to 18.

In the formula (I), when 2 or more $R^2$ groups exist, they may be the same or different. Examples of the $R^2$ are, for instance, an alkyl group such as methyl group or ethyl group, a cycloalkyl group such as cyclohexyl group, an aryl group such as phenyl group, and an aralkyl group such as benzyl group. Further, $R^2$ can be a triorganosiloxy group having the formula (II):

$(R')_3SiO-$   (II)

Among the above-mentioned $R^2$ groups, it is preferable that $R^2$ is methyl or phenyl group, because of easy obtaining.

In the formula (I), X is hydroxyl group or a hydrolyzable group. Examples of the hydrolyzable group are, for instance, a halogen atom, a hydrogen atom, an alkoxyl group, an acyloxy group, a ketoxymate group, an amino group, an amido group, an aminoxy group, a mercapto group, an alkenyloxy group, and the like. Among them, the alkoxyl group, especially methoxyl group, is preferable because of easiness in handling.

Examples of the main chain constituting the organic polymer are, for instance, an alkylene oxide polymer, an ether-ester block copolymer, a vinyl polymer, a vinyl copolymer, a diene polymer, and the like.

The organic polymer (A) composed of alkylene oxide polymer or ether-ester block copolymer as the main chain can be prepared, for instance, by the methods disclosed in U.S. Pat. Nos. 3,592,795 and 3,408,321, Japanese Patent Examined Publication (Tokkyo Kokoku) Nos. 36319/1970, 12154/1971 and 32673/1974 and Japanese Patent Unexamined Publication (Tokkyo Kokai) Nos. 156599/1975, 73561/1976, 6096/1979, 13768/1980, 82123/1980, 123620/1980, 125121/1980, 131021/1980, 131022/1980, 135135/1980 and 137129/1980. Also, the organic polymer (A) composed of a vinyl polymer or copolymer as a main chain can be prepared, for instance, by the methods disclosed in Tokkyo Kokoku No. 28301/1976 and Tokkyo Kokai No. 179210/1982. Further the organic polymer (A) composed of a diene polymer as a main chain can be prepared, for instance, by the methods disclosed in Tokkyo Kokoku No. 17553/1970 and Tokkyo Kokai 1389/1972.

In the present invention, when the alkylene oxide organic polymer (A) is used, it is preferable that the main chain has essentially recurring units of the formula (III):

$-R^1-O-$   (III)

wherein $R^1$ is a bivalent hydrocarbon group having 1 to 8 carbon atoms. Especially, $R^2$ is a bivalent hydrocarbon group having 1 to 4 carbon atoms.

The term "essentially" as mentioned above means that the main chain may include monomer units and/or polymer units other than $-R^1-O-$. Examples of the bivalent hydrocarbon group $R^1$ having 1 to 8 carbon atoms are, for instance,

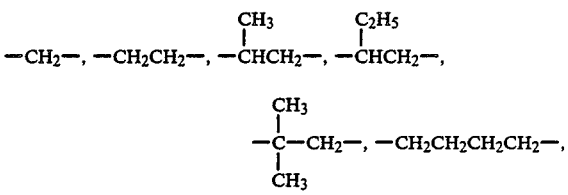

and the like.

The main chain of the alkylene oxide polymer may be composed of recurring units of one kind, or 2 or more kinds. Particularly, it is preferable that $R^1$ is

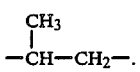

It is preferable that the molecular weight of the alkylene oxide polymer is 500 to 30,000, more preferably 3,000 to 15,000. Particularly, a polymer having reactive silicon group or groups at the molecular end or ends and having a molecular weight of 3,000 to 15,000 is preferred as the alkylene oxide polymer (A).

The alkylene oxide polymer having the reactive silicon group within the molecule can be prepared, for instance, by the hydrosilylation, that is, addition reaction of a hydrosilane having the formula (I'):

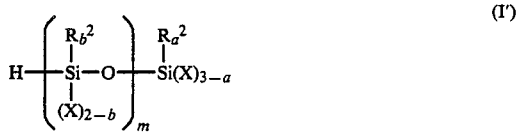

(I')

wherein $R^2$, X, a, b and m are as defined above, to an alkylene oxide polymer containing an unsaturated group represented by the formula (IV):

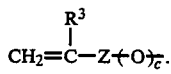 (IV)

wherein $R^3$ is hydrogen atom, a halogen atom or a monovalent substituted or unsubstituted organic group having 1 to 20 carbon atoms, Z is a bivalent organic group having 1 to 40 carbon atoms, preferably 1 to 20 carbon atoms and c is 0 or 1, in the presence of a platinum catalyst such as chloroplatinic acid. The process for preparing the alkylene oxide polymer (A) is not limited the above-mentioned process.

Examples of the hydrosilane (I') are, for instance, halogenated silanes such as trichlorosilane, methyldichlorosilane, dimethylchlorosilane, and trimethylsiloxydichlorosilane; alkoxy silanes such as trimethoxysilane, triethoxysilane, methyldimethoxysilane, phenyldimethoxysilane, and 1,3,3,5,5,7,7-heptamethyl-1,1-dimethoxytetrasiloxane; acyloxysilanes such as methyldiacetoxysilane, and trimethylsiloxymethylacetoxysilane; ketoxymate silanes such as bis(dimethylketoxymate)methylsilane, bis(cyclohexylketoxymate)methyl silane, and bis(diethylketoxymate)trimethylsilane; hydro silanes such as dimethylsilane, trimethylsiloxymethyl silane, and 1,1-dimethyl-3,3-dimethyldisiloxane; alkenyloxy silanes such as methyldi(isopropenyloxy)silane; and the like.

In the reaction of the hydrosilane having the formula (I') and the alkylene oxide polymer having unsaturated groups represented by the formula (IV), after the completion of the reaction, a part or all of the X groups may be converted into other hydrolyzable groups or hydroxyl group. For instance, in case that the X group in the formula (I') is a halogen atom or hydrogen atom, it is rather preferable that the X group is converted into an alkoxyl group, an acyloxy group, an aminoxy group, an alkenyloxy group, hydroxyl group, or the like.

In the formula (IV), $R^3$ is hydrogen atom, a halogen atom or a monovalent substituted or unsubstituted organic group having 1 to 20 carbon atoms. It is preferable that $R^3$ is hydrogen atom or a hydrocarbon group, more preferably hydrogen atom. Z is a bivalent organic group having 1 to 40 carbon atoms, preferably 1 to 20 carbon atoms. It is preferable that Z is

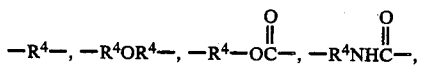

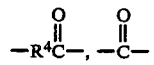

wherein $R^4$ is a bivalent hydrocarbon group having 1 to 20 carbon atoms, and when two $R^4$ groups are present, they may be the same or different. Methylene group is particularly preferred as Z.

The alkylene oxide polymer having the unsaturated group represented by the formula (IV) can be prepared by various methods, for instance, by a method disclosed in Tokkyo Kokai No. 6097/1979, or a method wherein as ethylene oxide or propylene oxide is copolymerized with an olefin group-containing epoxy compound such as allyl glycidyl ether to produce an alkylene oxide polymer having the unsaturated group (IV) as side chains.

An organic polymer having a vinyl polymer, a vinyl copolymer or a diene polymer as a main chain can also be employed as the organic polymer (A). Examples of the main chain of these organic polymer (A) are, for instance, polybutadiene, styrene-butadiene copolymer, acrylonitrile-butadiene copolymer, acrylic acid ester-butadiene copolymer, vinylpyridine-butadiene copolymer, ethylene-propylene copolymer, ethylene-vinylacetate copolymer, ethylene-acrylic acid ester copolymer, polyisoprene, styrene-isoprene copolymer, isobutylene-isoprene copolymer, polychloroprene, styrene-chloroprene copolymer, acrylonitrile-chloroprene copolymer, polyisobutylene, polyacrylic acid ester, polymethacrylic acid ester, and the like. That is, any of the polymers having rubber-like properties as mentioned above to which the reactive silicon group is introduced can be employed as the organic polymer (A) used in the invention. Particularly, an organic polymer including an acrylic acid ester or methacrylic acid ester as a main component, that is, an organic polymer composed of at least 50% by weight of an acrylic acid ester or methacrylic acid ester is preferable. Concretely, as the organic polymer (A) employed in the invention, there are preferred those prepared from a polymer or copolymer including as a main component acrylic acid esters or methacrylic acid esters of linear, branched or alicyclic alcohols having 2 to 12 carbon atoms such as n-butyl acrylate, n-butyl methacrylate, 2-ethylhexyl acrylate, 2-ethylhexyl methacrylate, ethyl acrylate, propyl acrylate, isobutyl acrylate, isobutyl methacrylate, amyl acrylate, amyl methacrylate, hexyl acrylate, hexyl methacrylate, cyclohexyl acrylate, cyclohexyl methacarylate, n-octyl acrylate, n-octyl methacrylate, n-decyl acrylate or n-decyl methacrylate. When the number of carbon atoms of the alcohol is less than or more than the above range, the adhesive strength of the organic polymer (A) is lowered. Particularly, the organic polymer including n-butyl acrylate or 2-ethylhexyl acrylate as a main component is preferable.

The vinyl polymer having the reactive silicon group employed in the invention as the polymer (A) may contain units of other copolymerizable monomers in the proportion of less than 50% by weight, preferably less than 40% by weight, more preferably 20% by weight.

Examples of the above-mentioned other copolymerizable monomer are, for instance, methacrylic acid, methyl methacrylate, acrylic acid, vinyl acetate, vinyl propionate, acrylonitrile, methacrylonitrile, acrylic amide, styrene, hydroxyethyl acrylate, hydroxyethyl methacrylate, N,N-di-methylaminoethyl acrylate, vinyl acrylate, allyl acrylate, and the like. These copolymerizable monomers have an effect of improving the adhesive srength and cohesive strength when used within the above-mentioned range, but the use thereof in an amount of not less than 50% by weight should be avoided, because the tack (initail adhesive strength) is lowered.

The introduction of the reactive silicon group into the vinyl polymer, vinyl copolymer and diene polymer can be attained by various processes, e.g. a process wherein a monomer having the reactive silicon group is copolymerized with vinyl or diene monomers, a process wherein a polymerization initiator having the reactive silicon group is employed, a process wherein a chain transfer agent having the reactive silicon group is employed, a combination of the above-mentioned processes, or a process wherein a monomer having no reactive silicon group is polymerized, and after the completion of the polymerization, a compound having the reactive silicon group and a reactive group capable of reacting with the produced polymer is reacted. The processes preparing the organic polymer having the reactive silicon group are not limited to the above-mentioned processes.

Examples of the above-mentioned monomer having the reactive silicon group are, for instance, $CH_2=CHSi(OCH_3)_2$, $CH_2=CHSi(OCH_2CH_3)_2$,
      |                        |
      $CH_3$                   $CH_3$

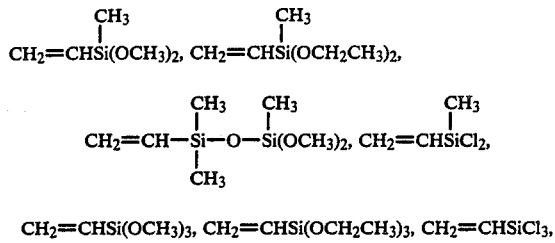

$CH_2=CHSi(OCH_3)_3$, $CH_2=CHSi(OCH_2CH_3)_3$, $CH_2=CHSiCl_3$,

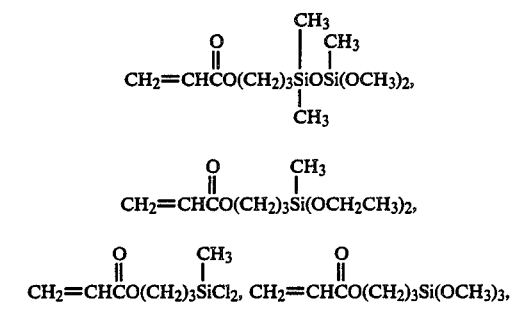

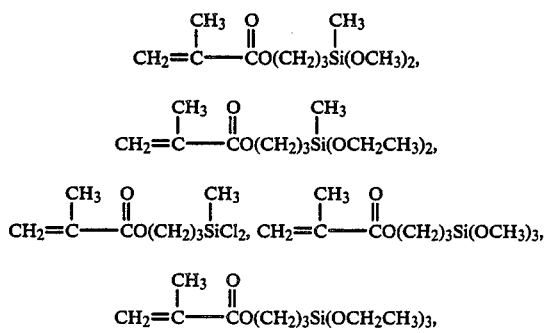

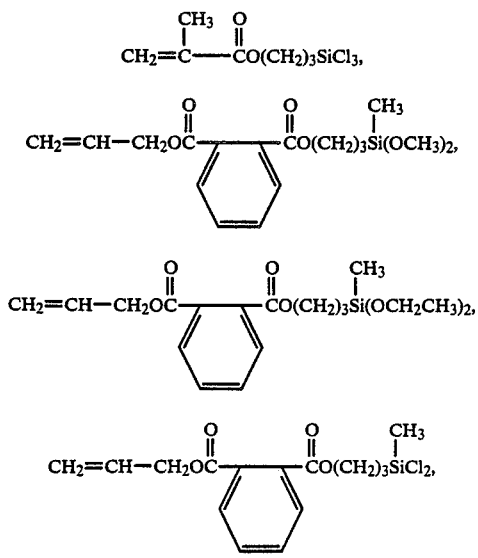

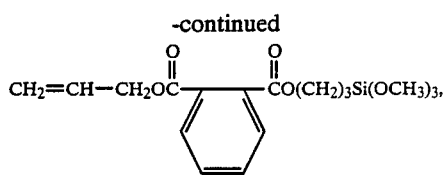

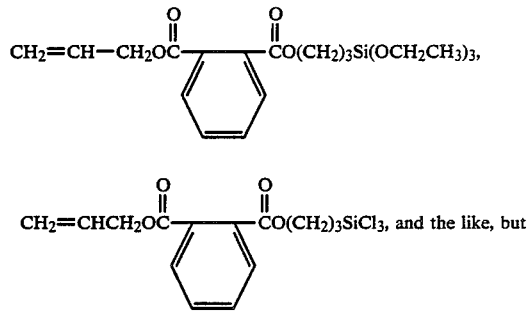

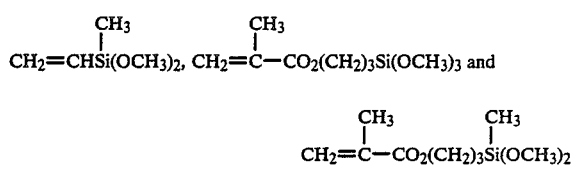

the monomers having the reactive silicon group are not limited to the above-mentioned monomers. Among them, $CH_2=CHSi(OCH_3)_2$, $CH_2=C-CO_2(CH_2)_3Si(OCH_3)_3$ and
      |                      |
      $CH_3$                 $CH_3$ $$CH_2=\underset{CH_3}{\underset{|}{C}}-CO_2(CH_2)_3Si(OCH_3)_2$$
           |
          $CH_3$ are particularly preferable.

Examples of the polymerization initiator having the reactive silicon group are, for instance, azo compounds such as

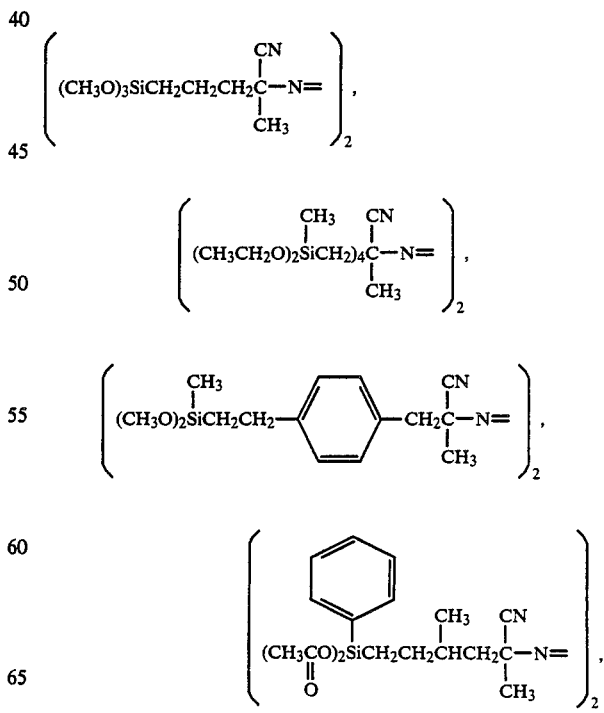

azobis-2-(6-methyldimethoxysilyl-2-cyanohexane),

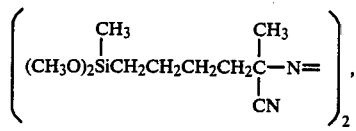

azobis-2-(6-trimethoxysilyl-2-cyanohexane), and azobis-2-(6-methyldiacetoxysilyl-2-cyanohexane); peroxide compounds such as

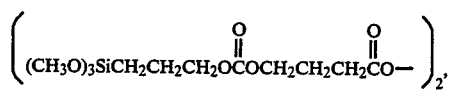

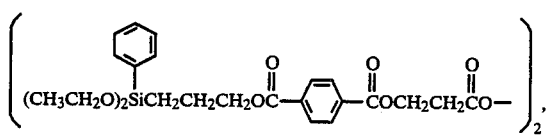

and the like, but the polymerization initiators are not limited thereto.

Examples of the chain transfer agent having the reactive silicon group are, for instance,

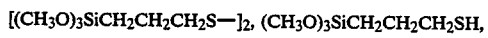

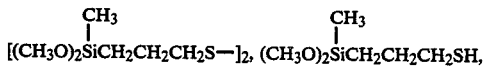

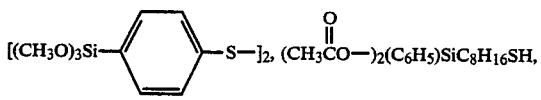

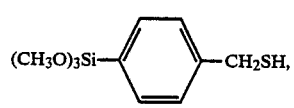

and the like, but the chain transfer agents are not limited thereto.

The vinyl polymer (A) having the reactive silicon group can be prepared by usual polymerization methods such as a method using a radical initiator and a method by irradiation of ultraviolet ray, X-ray or γ-ray.

Examples of the radical initiator used in the invention are the above-mentioned radical initiators having reactive silicon group, peroxides such as benzoyl peroxide, benzoyl hydroperoxide, di-t-butyl peroxide, di-t-butyl hydroperoxide, acetyl peroxide, lauroyl peroxide and hydrogen peroxide; azo compounds such as azobisisobutyronitrile; other peroxides such as persulfates and diisopropyl peroxycarbonate; and the like.

When the vinyl polymer having the reactive silicon group is prepared, a solvent may be employed, as occasion demands. Examples of the solvent are, for instance, ethers, hydrocarbons, acetic acid esters, and the like.

The polymerization temperature is not particularly limited and the suitable temperature is determined depending on kinds of polymerization method, and also in case of using a radical initiator, depending on the kinds of the initiators used. Generally, it is preferable that the polymerization is carried out at a temperature of 50° to 150° C. If necessary, the degree of polymerization of the vinyl polymer may be regulated by employing chain transfer agents such as mercaptans, halogen-containing compounds.

When the polymerization is carried out, the whole amount of all starting materials such as vinyl monomers may be supplied at once, or for controlling the heat generation, the monomers may be supplied intermittently or continuously.

The vinyl polymer having the reactive silicon group employed in the invention has a molecular weight of 500 to 1,000,000, preferably 2,000 to 500,000. Particularly, in case that the vinyl polymer has the reactive silicon group at the molecular end, it is preferable that the vinyl polymer has a molecular weight of 3,000 to 15,000.

The organic polymers (A) employed in the invention may be alone or in admixture thereof. For example, the organic polymer (A) may be a mixture of the above-mentioned alkylene oxide polymer and the vinyl polymer such as a polyalkyl acrylate, or a polymer having the reactive silicon group prepared by polymerizing the vinyl monomer such as an alkyl acrylate in the presence of the above-mentioned alkylene oxide polymer.

The feature of the present invention is that the organic zirconium or the organic aluminium is employed as the curing catalyst (B). The releasability of the pressure sensitive adhesive of the invention from a silicone release paper can be remarkably improved by employing the above curing catalysts.

In the invention, the organic zirconium or the organic aluminium is a compound in which an organic group is attached to zirconium or aluminium, e.g. alkoxide or chelate compounds of zirconium or aluminium having the formula (V) or the formula (VI):

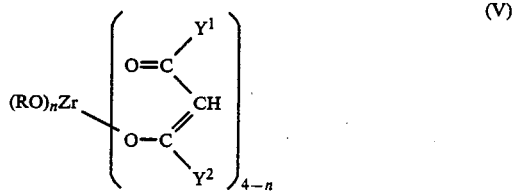

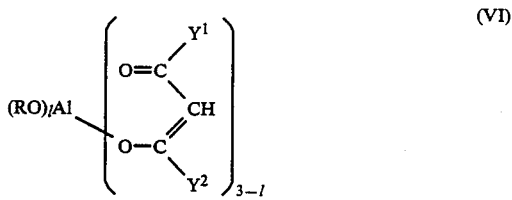

wherein R is a monovalent hydrocarbon group having 1 to 20 carbon atoms, $Y^1$ and $Y^2$ are the same or different and each is a group selected from the group consisting of a hydrocarbon group having 1 to 8 carbon atoms, a halogenated hydrocarbon group having 1 to 8 carbon atoms, a cyanoalkyl group having 1 to 8 carbon atoms, an alkoxyl group having 1 to 8 carbon atoms, a halogenated alkoxyl group having 1 to 8 carbon atoms, cyanoalkoxyl group having 1 to 8 carbon atoms and amino group, n is 0 or an integer of 1 to 4 and 1 is 0 or an integer of 1 to 3, and organic acid salts of zirconium or aluminium. The compounds in the associated form or the like may be employed as the curing catalyst.

Examples of the curing catalyst (B) are, for instance, alkoxide compounds such as $(C_2H_5O)_4Zr$, $(iso-C_3H_7O)_4Zr$, $(n-C_4H_9O)_4Zr$, $(C_8H_{17}O)_4Zr$, $(iso-C_3H_7O)_3Al$, $(iso-C_3H_7O)_2Al(sec-C_4H_9O)$ and $(sec-C_4H_9O)_3Al$; chelate compounds such as $Zr(acac)_4$ (zirconium tetraacetylacetonato, hereinafter the acetylacetonato being referred to as "acac"), $(n-C_4H_9O)_3Zr(acac)$, $(n-C_4H_9O)_2Zr(acac)_2$, $(n-C_4H_9O)Zr(acac)_3$, $(iso-C_3H_7O)_2Al(acac)$, $Al(acac)_3$, $(iso-C_3H_7O)_2Al(ethyl\ acetoacetate)$ and $Al(ethyl\ acetoacetate)_3$; organic acid salts such as $(CH_3COO)_2ZrO$, $(C_7H_{15}COO)_2ZrO$ and $(C_{15}H_{31}COO)_2ZrO$; and the like, but the curing catalyst is not limited to these examplifed compounds. Further, even if these organic zirconium and organic aluminium are in the associated form such as a trimer and a tetramer, they can be employed as the curing catalyst in the invention. The curing catalysts may be employed alone or in admixture thereof.

The curing catalyst is employed in an amount of 0.1 to 20 parts by weight per 100 parts by weight of the organic polymer (A). When the amount of the catalyst is less than 0.1 part by weight, a satisfactory catalytical action is not obtained, while when the amount is more than 20 parts by weight, a curing rate of the polymer becomes too high to lower the workability in application of the composition to a substrate.

The curing catalyst employed in the invention has a curing activity which is in no way inferior to that of orgnotin compound which hitherto has been employed, and moreover does not have a problem that the pressure sensitive adhesive is colored as seen in the case of employing an alkyl titanate compound as the catalyst, thus is excellent in both the productivity and the appearance of the pressure sensitive adhesive.

In the present invention, a tackifier may be employed in order to control the adhesive strength of the pressure sensitive adhesive. The tackifier employed in the invention is not limited. Examples of the tackifier are, for instance, resins having a polar group such as a rosin ester resin, a phenol resin, a xylene resin, a xylene-phenol resin and a terpene-phenol resin; various petroleum resins having a relatively small polarity such as an aromatic petroleum resin, an aliphatic-aromatic copolymer petroleum resin or an alicyclic petroleum resin; and usual tackifiers such as a cumarone resin, a polystyrene resin having low molecular weight and a terpene resin.

Typical examples of the tackifiers which are commercially available are, for instance, a resin having a relatively small polarity such as an aromatic petroleum resin (commercially available under the commercial name "Petrosin 80", made by Mitsui Petrochemical Industries, Ltd.), an aromatic petroleum resin (commercially available under the commercial name "Neopolymer S", made by Nippon Sekiyu Kagaku Kabushiki Kaisha), a petroleum resin (commercially available under the commercial name "Tackace A 100", made by Mitsui Petrochemical Industries, Ltd.), an aliphatic petroleum resin (commercially available under the commercial name "Quintone 1500", made by Nippon Zeon Co., Ltd.), a petroleum resin (commercially available under the commercial name "FTR 6100", made by Mitsui Petrochemical Industries, Ltd.), a styrene resin (commercially available under the commercial name "Piccolastic A 75", made by Hercules Inc.) or a cumarone-indene resin (commercially available under the commercial name "Cumarone G-90", made by Nittetu Kagaku Kabushiki Kaisha); a resin having a polar group such as a terpene-phenol resin (commercially available under the commercial name "YS Polystar T-115", made by Yasuhara Yushi Kogyo Co., Ltd.), a terpene-phenol resin (commercially available under the commercial name "YS Polystar S-145", made by Yasuhara Yushi Kogyo Co., Ltd.), a hydrogenated rosin resin (commercially available under the commercial name "Staybelite Ester 7", made by Hercules Inc.), or an aromatic petroleum resin (commercially available under the commercial name "Neopolymer E-100", made by Nippon Sekiyu Kagaku Kabushiki Kaisha); and the like, but the tackifiers are not limited to these examplified resins.

The amount of the tackifier is determined depending on the kinds of the tackifier, but it is preferable to employ in an amount of 1 to 140 parts by weight per 100 parts by weight of the organic polymer (A). When the amount of the tackifier is more than 140 parts by weight, it is difficult to obtain the pressure sensitive adhesive having an excellent tack.

The composition of the invention may optionally include a plasticizer, a softening agent, a filler, an antioxidant, an ultra-violet absorbent, a pigment, a surfactant and other additives. Examples of the plasticizer or the softening agent are, for instance, dioctyl phthalate, butylbenzyl phthalate, polypropylene glycol, chlorinated paraffin, liquid polybutadiene, and the like. Examples of the filler are, for instance, calcium carbonate, clay, talc, titanium oxide, zinc oxide, silica, silicious earth, barium sulfate, and the like.

A solvent may be incorporated into the pressure sensitive adhesive composition of the invention in order to improve the workability or to lower the viscosity of the composition. Examples of the solvent are, for instance, an aromatic hydrocarbon solvent such as toluene or xylene; an ester solvent such as ethyl acetate, butyl acetate, amyl acetate or Cellosolve acetate; a ketone solvent such as methyl ethyl ketone, methyl isobutyl ketone or diisobutyl ketone; and the like.

The pressure sensitive adhesive composition can be employed for the wide use such as a pressure sensitive adhesive tape, sheet, label or foil. The pressure sensitive adhesive product can be produced from the composition of the invention, for instance, according to the following method. That is to say, the composition of the invention in the form of a non-solvent liquid or a solvent solution, or in the form of an emulsion or in the molten state is applied to a substrate such as a film of synthetic resin or modified natural substance, a paper, a cloth, a metallic foil, a metallized plastic foil, an asbestos cloth, or a glass fiber cloth, and is then exposed to moisture or water, and the composition is cured at room temperature or by heating.

The present invention is more specifically described and explained by the following Examples in which all percents and parts are by weight unless otherwise noted. It is to be understood that the present invention is not limited into the Examples, and various changes and modification may be made in the invention without departing from the spirit and scope thereof.

In Examples, tests were carried out as follows:
(Peel strength of the pressure sensitive adhesive to a silicone release paper)

A prepared pressure sensitive adhesive tape is laminated to a commercially available silicone release paper and it is adhered at 50° C. for 7 days, 14 days or 21 days. After the temperature of the tape is lowered to room temperature, the peel strength is measured when the release paper is peeled off from the tape at an angle between the tape and the release paper of 180° at a test speed of 300 mm/minute.

(Percentage of remaining adhesive strength)

A prepared pressure sensitive adhesive tape is laminated to a commercially available silicone release paper and is allowed to stand at 50° C. Then, the adhesive strength of the pressure sensitive adhesive composition layer of the tape obtained by peeling off from the release paper is measured. A percentage of the above adhesive strength to the adhesive strength at the initial is shown as a percentage of remaining adhesive strength.

(Adhesive strength)

A prepared pressure sensitive adhesive tape is laminated onto a stainless steel plate and it is allowed to stand at 23° C. for 60 minutes. Then a 180°-peel strength of the pressure sensitive adhesive composition is measured at 23° C. at a test speed of 300 mm/minute.

REFERENCE EXAMPLE 1

(Preparation of an alkylene oxide polymer having a reactive silicon group)

A pressure vessel equipped with a stirrer was charged with 800 g of a polypropylene oxide having an average molecular weight of 8,000 and having allyl ether group at 98% of the whole polymer ends (this oxide was prepared by using a polypropylene glycol as a starting material), and then 20 g of methyldimethoxysilane was added to the vessel, and subsequently, 0.34 ml of a catalyst solution including chloroplatinic acid (a solution of 8.9 g of $H_2PtCl.6H_2O$ dissolved in 18 ml of isopropyl alcohol and 160 ml of tetrahydrofuran) was added. Then the reaction was carried out for 6 hours at 80° C.

The amount of unreacted silane was measured by means of a gas chromatography and an infrared analysis in order to know a reaction ratio. From the result, it was confirmed that 84% of the whole polymer ends was reacted and polypropylene oxide having the group represented by the formula:

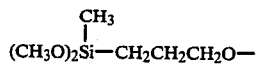

at the polymer end was obtained.

REFERENCE EXAMPLE 2

(Preparation of an acrylic acid ester polymer having a reactive silicon group)

There were admixed and dissolved 128 g (1.0M) of n-butyl acrylate, 3.48 g (0.015M) of γ-methacryloyloxypropylmethyldimethoxysilane, 2.46 g (0.015M) of γ-mercaptopropylmethyldimethoxysilane and 0.25 g of α,α'-azobisisobutylonitrile. A 300 milliliter four neck flask was charged with 30 g of the mixture under nitrogen gas atmosphere and it was gradually heated in an oil bath having a temperature of 70° C. with stirring. Soon, the polymerization reaction started, and an exothermic reaction and an increase of viscosity of the mixture took place. The remaining above mixture was gradually added dropwise to the flask over 2.5 hours through a dropping funnel with stirring. After adding, the polymerization reaction was further continued for 1 hour with stirring. A colorless and transparent mucilage having a viscosity of 350 poises (at 23° C.) was obtained. The polymerization conversion was 97%.

REFERENCE EXAMPLE 3

(Preparation of an organic zirconium curing catalyst)

In 88 g of toluene was dissolved 38.3 g (0.1M) of tetra-n-butoxyzirconium, and 10.0 g (0.1M) of acetylacetone was gradually added to the resulting solution with stirring. An exothermic reaction of the mixture took place to give tri-n-butoxyzirconium acetylacetonato.

Hereinafter, the obtained toluene solution of tri-n-butoxyzirconium acetylacetonato was referred to as "catalyst of Reference Example 3".

REFERENCE EXAMPLE 4

(Preparation of an organic zirconium curing catalyst

In 87 g of toluene was dissolved 38.3 g (0.1M) of tetra-n-butoxyzirconium, and 20.0 g (0.2M) of acetylacetone was gradually added to the resulting solution with stirring. An exothermic reaction of the mixture took place to give di-n-butoxyzirconium bisacetylacetonato.

Hereinafter, the obtained toluene solution of di-n-butoxyzirconium bisacetylacetonato was referred to as "catalyst of Reference Example 4".

REFERENCE EXAMPLE 5

(Preparation of an organic zirconium curing catalyst)

In 86 g of toluene was dissolved 38.3 g (0.1M) of tetra-n-butoxyzirconium, and 30.0 g (0.3M) of acetylacetone was gradually added to the resulting solution with stirring. An exothermic reaction of the mixture took place to give di-n-butoxyzirconium trisacetylacetonato.

Hereinafter, the obtained toluene solution of di-n-butoxyzirconium trisacetylacetonato was referred to as "catalyst of Reference Example 5".

EXAMPLES 1 TO 9

A toluene solution having a solid concentration of 80% was prepared by admixing 80 parts of a tackifier shown in Table 1 with 100 parts of the polyalkylene oxide having the reactive silicon group obtained in Reference Example 1. To the obtained solution was added a catalsyt shown in Table 1. The obtained composition was applied to a polyester film (commercially available under the commercial name "Lumirror film" made by Toray Industries Inc.) having a thickness of 25 μm by employing a cotar so that the dry thickness of the coating was 25 μm. The composition was cured in a oven at 120° C. for 1 to 10 minutes.

The releasability of the obtained pressure sensitive adhesive tape from a silicone release paper (commercially available under the commercial name "EK-130R" made by Soken Kako Kabushiki Kaisha) was measured. The results are shown in Table 1.

In Table 1, YS Polystar T-115 and YS Polystar S 145 are terpene phenol resins and are available from Yasuhara Yushi Kogyo Co., Ltd. and Staybelite Ester 7 is a hydrogenated rosin ester resin and is available from Hercules Inc.

COMPARATIVE EXAMPLES 1 TO 3

The procedure of Example 1 was repeated except that an organotin compound shown in Table 1 was employed as a curing catalyst to give a pressure sensitive adhesive tape. The releasability of the obtained pressure sensitive adhesive tape was measured. The results are shown in Table 1.

TABLE 1

| | Tackifier | | Curing agent | | Curing time (minute) | Peel strength (g/cm) at 50° C. for 7 days |
|---|---|---|---|---|---|---|
| | Kinds | Commercial name | Kinds | Amount (part) | | |
| Ex. 1 | Terpene phenol resin | YS Polystar T-115 | Catalyst of Ref. Ex. 3 | 5*1 | 3 | 3 |
| Ex. 2 | Terpene phenol resin | YS Polystar T-115 | Catalyst of Ref. Ex. 4 | 5*2 | 3 | 2 |
| Ex. 3 | Terpene phenol resin | YS Polystar T-115 | Catalyst of Ref. Ex. 5 | 5*3 | 3 | 2 |
| Ex. 4 | Terpene phenol resin | YS Polystar S145 | Catalyst of Ref. Ex. 5 | 5*3 | 5 | 3 |
| Ex. 5 | Hydrogenated rosin-ester resin | Staybelite Ester 7 | Catalyst of Ref. Ex. 5 | 5*3 | 3 | 3 |
| Ex. 6 | Terpene phenol resin | YS Polystar T-115 | $Zr(acac)_4$ | 5 | 3 | 2 |
| Ex. 7 | Terpene phenol resin | YS Polystar T-115 | $(n-BuO)_4Zr$ | 5 | 10 | 4 |
| Ex. 8 | Terpene phenol resin | YS Polystar T-115 | $Al(acac)_3$ | 5 | 1 | 2 |
| Ex. 9 | Terpene phenol resin | YS Polystar T-115 | Diisopropoxy Al ethylacetoacetate | 5 | 3 | 5 |
| Com. Ex. 1 | Terpene phenol resin | YS Polystar T-115 | Dibutyl tin dilaurite | 5 | 15 | 260 |
| Com. Ex. 2 | Terpene phenol resin | YS Polystar T-115 | Dibutyl tin monononyl phenolate | 5 | 3 | 250 |
| Com. Ex. 3 | Terpene phenol resin | YS Polystar T-115 | Dibutyl tin dimethoxide | 5 | 3 | 240 |

| | Peel strength (g/cm) | | Adhesive strength (initial)(g/cm) | Percentage of remaining adhesive strength (%) | | |
|---|---|---|---|---|---|---|
| | at 50° C. for 14 days | at 50° C. for 21 days | | at 50° C. for 7 days | at 50° C. for 14 days | at 50° C. for 21 days |
| Ex. 1 | 3 | 2 | 360 | 90 | 92 | 90 |
| Ex. 2 | 4 | 3 | 365 | 89 | 92 | 92 |
| Ex. 3 | 3 | 3 | 360 | 94 | 97 | 95 |
| Ex. 4 | 3 | 4 | 750 | 92 | 93 | 91 |
| Ex. 5 | 3 | 3 | 160 | 84 | 80 | 78 |
| Ex. 6 | 3 | 3 | 360 | 74 | 78 | 74 |
| Ex. 7 | 4 | 5 | 370 | 77 | 76 | 75 |
| Ex. 8 | 3 | 3 | 350 | 80 | 78 | 81 |
| Ex. 9 | 6 | 6 | 375 | 78 | 80 | 80 |
| Com. Ex. 1 | Failure of release paper | Failure of release paper | 365 | 50 | — | — |
| Com. Ex. 2 | Failure of release paper | Failure of release paper | 360 | 34 | — | — |
| Com. Ex. 3 | Failure of release paper | Failure of release paper | 355 | 32 | — | — |

(note)
*1 The amount of $(n-BuO)_3Zr(acac)$ was 5 parts.
*2 The amount of $(n-BuO)_2Zr(acac)_2$ was 5 parts.
*3 The amount of $(n-BuO)Zr(acac)_3$ was 5 parts.

As apparent from Table 1, the pressure sensitive adhesive tapes of Examples 1 to 9 had a high adhesive strength and moreover could be easily peeled off from a silicone release paper. On the other hand, the pressure sensitive adhesive tapes of Comparative Examples 1 to 3 were poor in releasability from a silicone release paper and when maintained at 50° C. for 14 or 21 days, the release paper was broken upon peeling.

From the results in Table 1, it was confirmed that the pressure sensitive adhesive composition of the invention was excellent in the releasability from the silicone release paper in comparison with the composition of Comparative Examples.

EXAMPLES 10 TO 15

A toluene solution having a solid concentration of 80% was prepared by admixing 50 parts of YS Polystar T-115 with 100 parts of the acrylic acid copolymer having the reactive silicon group obtained in Reference Example 2. To the obtained mixture was added a curing catalyst shown in Table 2 and the obtained composition was applied to a polyester film (which was the same as that employed in Examples 1 to 9) having a thickness of 25 μm so that the dry thickness of the coating was 25 μm. The composition was cured in a oven at 120° C. for 3 minutes to give a pressure sensitive adhesive tape.

The releasability of the obtained pressure sensitive adhesive tape from a silicone release paper was measured in the same manner as in Examples 1 to 9. The results are shown in Table 2.

COMPARATIVE EXAMPLES 4 AND 5

The procedure of Example 10 was repeated except that an organotin compound shown in Table 2 was employed as a curing catalyst to give a pressure sensitive adhesive tape. The releasability of the obtained pressure sensitive adhesive composition was measured in the same manner as in Example 10. The results are shown in Table 2.

TABLE 2

| | Curing catalyst | | Peel strength (g/cm) | | | Adhesive strength (initial) (g/cm) | Percentage of remaining adhesive strength (%) | | |
|---|---|---|---|---|---|---|---|---|---|
| | Kinds | Amount (part) | at 50° C. for 7 days | at 50° C. for 14 days | at 50° C. for 21 days | | at 50° C. for 7 days | at 50° C. for 14 days | at 50° C. for 21 days |
| Ex. 10 | Catalyst of Ref. Ex. 3 | 5*1 | 3 | 3 | 3 | 320 | 84 | 80 | 81 |
| Ex. 11 | Catalyst of Ref. Ex. 4 | 5*2 | 3 | 2 | 3 | 330 | 78 | 79 | 81 |

TABLE 2-continued

| | Curing catalyst | | Peel strength (g/cm) | | | Adhesive strength (initial) (g/cm) | Percentage of remaining adhesive strength (%) | | |
|---|---|---|---|---|---|---|---|---|---|
| | Kinds | Amount (part) | at 50° C. for 7 days | at 50° C. for 14 days | at 50° C. for 21 days | | at 50° C. for 7 days | at 50° C. for 14 days | at 50° C. for 21 days |
| Ex. 12 | Catalyst of Ref. Ex. 5 | 5*3 | 2 | 3 | 3 | 315 | 82 | 82 | 80 |
| Ex. 13 | Zr(acac)$_4$ | 5 | 3 | 4 | 4 | 340 | 77 | 76 | 77 |
| Ex. 14 | Al(acac)$_3$ | 5 | 4 | 6 | 5 | 355 | 79 | 79 | 80 |
| Ex. 15 | Diisopropoxy Al ethylacetoacetate | 5 | 3 | 4 | 4 | 345 | 80 | 81 | 81 |
| Com. Ex. 4 | Dibutyl tin dilaurite | 5 | 120 | 250 | Failure of release paper | 360 | 45 | 33 | — |
| Com. Ex. 5 | Dibutyl tin monononyl phenolate | 5 | 65 | 170 | Failure of release paper | 355 | 38 | 24 | — |

(note)
*1 The amount of (n-BuO)$_3$Zr(acac) was 5 parts.
*2 The amount of (n-BuO)$_2$Zr(acac)$_2$ was 5 parts.
*3 The amount of (n-BuO)Zr(acac)$_3$ was 5 parts.

From the results in Table 2, it was confirmed that the pressure sensitive adhesive composition of the invention was excellent in the silicone-releasability in comparison with the composition of Comparative Examples.

What we claim is:

1. A process for forming pressure sensitive adhesive on a substrate which comprises
   (1) applying to a substrate a composition comprising
   (A) an organic polymer having at least one reactive silicon-containing group represented by the formula (I):

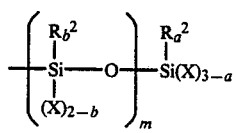

wherein R$^2$ is a monovalent hydrocarbon group having 1 to 20 carbon atoms or a triorganosiloxy group having the formula (II):

(R')$_3$SiO—      (II)

in which each R' is independently a monovalent hydrocarbon group having 1 to 20 carbon atoms, X is hydroxyl group or a hydrolyzable group, and when more than one X is present, each X is independently hydroxyl group or hydrolyzable group, a is 0 or an integer of 1 to 3, b is 0, 1 or 2 and m is 0 or an integer of 1 to 18, wherein said organic polymer is selected from the group consisting of an alkylene oxide polymer having a main chain consisting essentially of recurring units represented by the formula (III):

—R$^1$—O—      (III)

wherein R$^1$ is a bivalent hydrocarbon radical having 1 to 8 carbon atoms and an alkyl acrylate polymer, and
   (B) 0.1 to 20 parts by weight of, based on 100 parts by weight of said organic polymer, at least one curing catalyst selected from the group consisting of an organic aluminum and an organic zirconium, and
   (2) curing said composition.

2. The process of claim 1, wherein said hydrolyzable group X is a group selected from the group consisting of a halogen atom, hydrogen atom, an alkoxyl group, an acyloxyl group, a ketoxymate group, an amino group, an amido group, an aminoxy group, a mercapto group and an alkenyloxy group.

3. The process of claim 1, wherein said hydrolyzable group X is methoxyl group.

4. The process of claim 1, wherein said alkylene oxide polymer has a molecular weight of 3,000 to 15,000.

5. The process of claim 1, wherein said alkyl acrylate polymer has a molecular weight of 3,000 to 15,000.

6. The process of claim 1, wherein said curing catalyst (B) is a member selected from the group consisting of a compound having the formula (V):

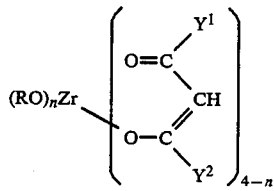

wherein R is a monvalent hydrocarbon group having 1 to 20 carbon atoms, Y$^1$ and Y$^2$ are independently a group selected from the group consisting of a hydrocarbon group having 1 to 8 carbon atoms, a halogenated hydrocarbon group, a cyanoalkyl group, an alkoxyl group, a halogenated alkoxyl group, a cyanoalkoxyl group and an amino group; and n is 0 or an integer of 1 to 4, and a compound having the formula (VI):

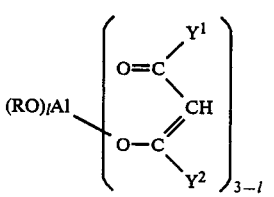

wherein l is 0 or an integer of 1 to 3, and R, Y$^1$ and Y$^2$ are as defined above.

* * * * *